United States Patent
Nishikawa (10) Patent No.: US 11,780,382 B2
(45) Date of Patent: Oct. 10, 2023

(54) VEHICLE MOUNTABLE CAMERA

(71) Applicant: DENSO CORPORATION, Kariya (JP)

(72) Inventor: Masato Nishikawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 17 days.

(21) Appl. No.: 17/644,054

(22) Filed: Dec. 13, 2021

(65) Prior Publication Data

US 2022/0185200 A1 Jun. 16, 2022

(30) Foreign Application Priority Data

Dec. 15, 2020 (JP) ................. 2020-207969

(51) Int. Cl.
| | |
|---|---|
| B60R 11/04 | (2006.01) |
| G06V 10/60 | (2022.01) |
| G06V 10/22 | (2022.01) |
| B60W 40/105 | (2012.01) |
| H04N 23/50 | (2023.01) |
| H04N 23/70 | (2023.01) |

(52) U.S. Cl.
CPC ........... *B60R 11/04* (2013.01); *B60W 40/105* (2013.01); *G06V 10/22* (2022.01); *G06V 10/60* (2022.01); *H04N 23/50* (2023.01); *H04N 23/70* (2023.01); *B60W 2420/42* (2013.01); *B60W 2520/14* (2013.01)

(58) Field of Classification Search
CPC . B60R 11/04; B60R 2011/0026; H04N 23/70; H04N 23/71; H04N 23/76; H04N 23/50
See application file for complete search history.

(56) References Cited

U.S. PATENT DOCUMENTS

| | | | | |
|---|---|---|---|---|
| 2019/0315289 A1* | 10/2019 | Okuda | ............... | B60R 11/04 |
| 2019/0394377 A1* | 12/2019 | Zama | ............... | H04N 23/75 |
| 2021/0058223 A1 | 2/2021 | Sakuma et al. | | |

FOREIGN PATENT DOCUMENTS

JP 2019-146012 A 8/2019

\* cited by examiner

*Primary Examiner* — Kathleen V Nguyen (74) *Attorney, Agent, or Firm* — MASCHOFF BRENNAN (57) ABSTRACT

A vehicle mountable camera is provided which includes an imaging device, an exposure controller, and an image processor. The imaging device is configured to be installed behind a windshield of a subject vehicle to capture an image of a forward view in front of the subject vehicle. The exposure controller controls the degree of exposure of the imaging device. The image processor executes an image processing operation on the captured image. The camera determines whether a brightness boundary exists in front of the subject vehicle and, when the brightness boundary is determined to exist, controls the exposure of the imaging device and/or adjustment of brightness of the image quickly when the subject vehicle passes the brightness boundary. This minimizes a risk that the captured image may be darkened or brightened suddenly immediately after the subject vehicle moves from a sunny area to a shaded area or vice versa.

10 Claims, 8 Drawing Sheets

VEHICLE MOUNTABLE CAMERA

CROSS REFERENCE TO RELATED DOCUMENT

The present application claims the benefit of priority of Japanese Patent Application No. 2020-207969 filed on Dec. 15, 2020, the disclosure of which is incorporated herein by reference.

BACKGROUND

1. Technical Field

This disclosure relates generally to a vehicle mountable camera which is mountable in a vehicle.

2. Background Art

Japanese Patent First Publication No. 2019-146014 teaches an in-vehicle camera which includes an imaging device, and an exposure controller, and an image processor. The imaging device is mounted behind a windshield of a subject vehicle and captures an image of a forward view in front of the subject vehicle. The exposure controller controls the degree of exposure of the imaging device. The image processor performs an image processing operation on the captured image.

The above type of camera has a risk that light which is emitted from an in-vehicle light source, such as a smartphone, and reflected on the windshield may be received by the imaging device, which results in unexpected appearance of the in-vehicle light source in front of a subject in an image captured by the camera. In order to avoid the above risk, some cameras are equipped with a hood which protrudes forward below the imaging device.

The hood serves to block light which is emitted from an in-vehicle light source and then reflected on a windshield of the vehicle so that it may enter the imaging device, thereby eliminating a risk that unexpected appearance of the in-vehicle light source may appear in the image. However, as a tradeoff, light of the sun in a sunny area that passes through the windshield is reflected on the surface of the hood, and also reflected by the windshield, and then enters the imaging device, thereby causing the sun to appear unexpectedly in front of the subject in the image.

Consequently, in the sunny area, the exposure controller needs to reduce the exposure of the camera. The image processor needs to lower the gain of amplification of the image to decrease the brightness of the image. Alternatively, in the shaded area, the exposure controller needs to increase the exposure of the camera. The image processor also needs to raise the gain to increase the brightness of the image.

However, immediately after the subject vehicle moves from the sunny area to the shaded area, the unexpected presence of the sun will suddenly disappear. In such an event, there is a probability that the regulation to increase the exposure may not be achieved in time, which will result in the image being darkened undesirably. Conversely, immediately after the subject vehicle moves from the shaded area into the sunny area, the unexpected appearance of the sun will suddenly appear in the image, which results in probability that the regulation to decrease the exposure may not be achieved in time, which will result the image being brightened excessively.

The above discussion has referred to a camera with a hood, however, a camera without a hood faces a similar risk that light of the sun passing through the windshield may be reflected on a dashboard of the vehicle and also reflected again on the windshield so that it may enter the imaging device, thereby resulting in unexpected appearance of the sun in the image. Such a problem usually occurs significantly in the camera with the hood, but also occurs in the camera without the hood.

SUMMARY

It is an object of this disclosure to provide a vehicle mountable camera which is capable of minimizing a risk that a captured image may be darkened or brightened suddenly immediately after a subject vehicle moves from a sunny area to a shaded area or vice versa.

According to one aspect of this disclosure, there is provided a vehicle mountable camera which comprises: (a) an imaging device which is configured to be disposed behind a windshield of a subject vehicle and works to capture an image of a forward view in front of the subject vehicle; (b) an exposure controller which controls exposure of the imaging device; and (c) an image processor which performs an image processing operation on the image captured by the imaging device.

The vehicle mountable camera also comprises: (d) a boundary determiner which performs a boundary determination of whether there is a brightness boundary where a level of brightness changes by a given reference level or more in a forward region in front of the subject vehicle in the image in a traveling direction in which the subject vehicle is heading; and (e) a brightness boundary controller which, when the brightness boundary is determined by the boundary determiner to exist, executes a boundary brightness control strategy to change at least one of the exposure and image brightness in the image processing operation.

As described above, the vehicle mountable camera works to determine whether the brightness boundary exists in front of the subject vehicle and executes the boundary brightness control strategy when the brightness boundary is determined to exist. The boundary brightness control strategy is to quickly control or adjust at least one of the exposure and adjustment of the image brightness when the subject vehicle passes the brightness boundary. This minimizes a risk that the image may be darkened or brightened undesirably immediately after the subject vehicle moves from a sunny area to a shaded area or vice versa.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Embodiments will be described below with reference to the drawings. Each of the embodiments may be designed to include all possible combinations or modifications of the components in the other embodiments.

First Embodiment

Figure 1:
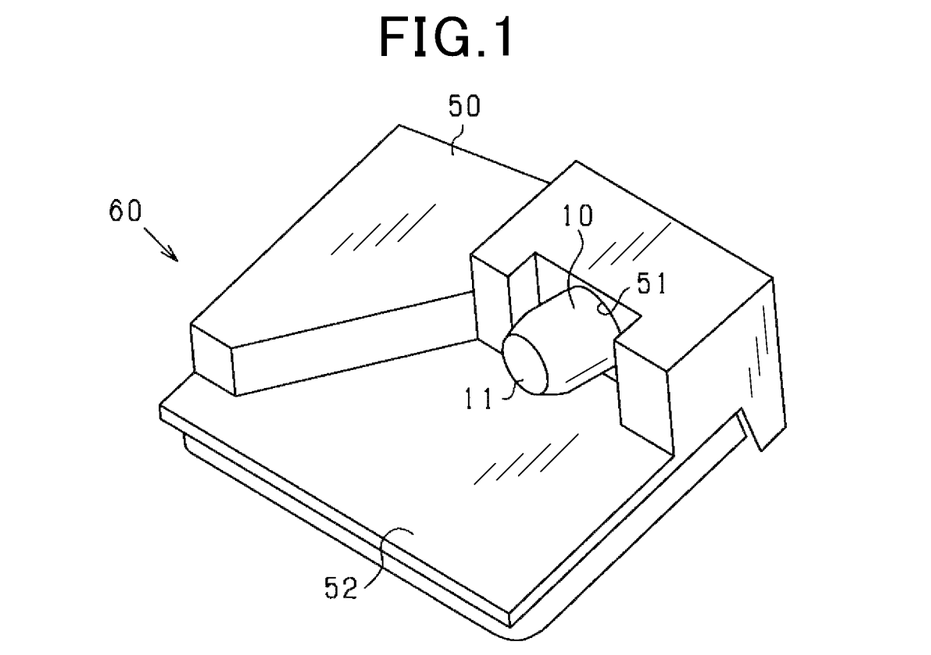
FIG. 1 is a perspective view which illustrates a camera according to the first embodiment.

FIG. 1 is a perspective view which illustrates the vehicle-mountable camera 60 according to the first embodiment. In the following discussion, a region behind the subject vehicle 80 equipped with the camera 60 will be referred to as a forward region or forward side. A region in back of the subject vehicle 80 will be referred to as a rearward region or rear side. The width-wise direction of the subject vehicle 80 will also be referred to as a lateral direction. The camera 60 is arranged, for example, inside the windshield 88 and hidden behind a rearview mirror from a driver's view to have a given imaging region in front of the subject vehicle 80.

The camera 60 includes the housing 50 and the imaging device 10. The imaging device 10 is disposed in the housing 50 and protrudes frontward from the lens hole 51 of the housing 50. The imaging device 10 has the lens 11 installed in a front end thereof. The housing 50 is equipped with the hood 52 which extends or protrudes forward below the lens 11. The hood 52 is of a plate shape expanding longitudinally and laterally.

Figure 2:
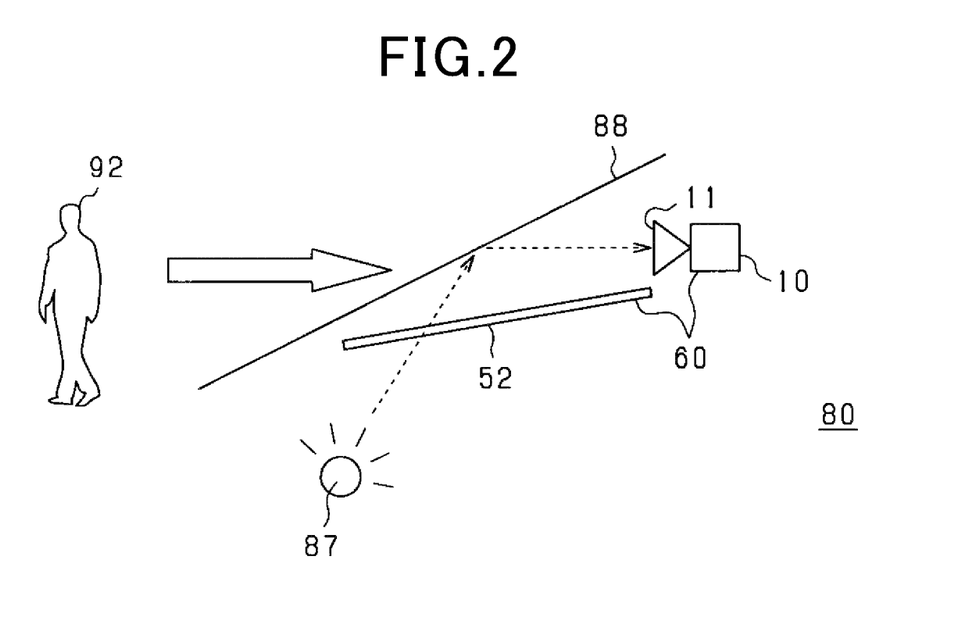
FIG. 2 is a side view which illustrates a camera and a region around the camera in the first embodiment.

FIG. 2 is a side view of the camera 60 and peripheries of the camera 60. The hood 52 serves to block light which is emitted from the in-vehicle light source 87, such as a smartphone, and reflected, as indicated by a broken line, on the windshield 88 so that it may enter the lens 11, thereby avoiding unexpected appearance of the in-vehicle light source 87 in front of the subject 92 in an image captured by the camera 60.

Figure 3:
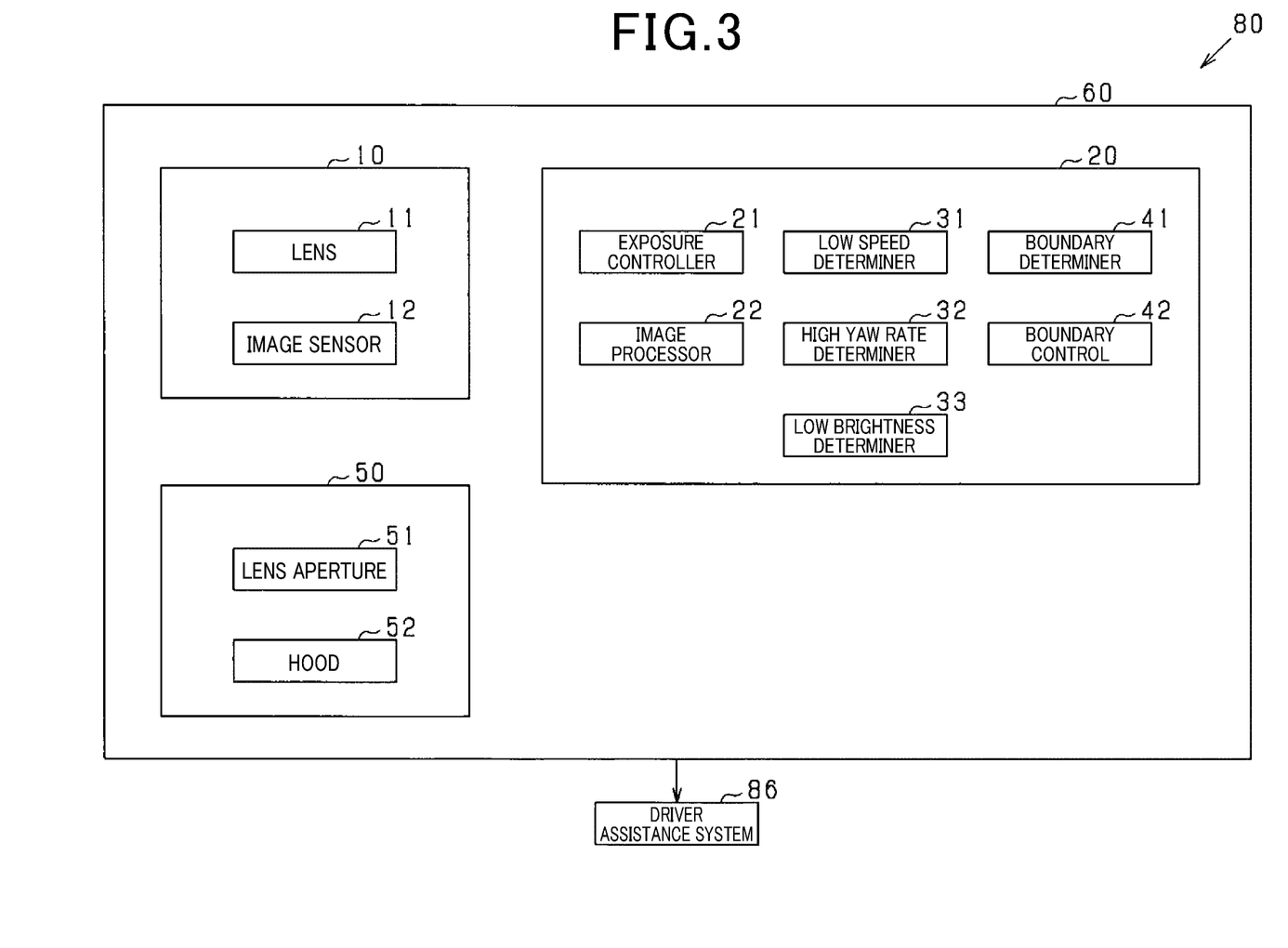
FIG. 3 is a block diagram which illustrates a structure of a camera and a region around the camera in the first embodiment.

FIG. 3 is a schematic diagram which illustrates the camera 60 and peripheries of the camera 60. The imaging device 10 includes the image sensor 12 in addition to the lens 11 described already. The image sensor 12 is equipped with photodiodes one for each pixel. Each of the photodiodes is responsive to input of light whose intensity lies in a range of a lower limit to an upper limit to output an electrical signal as a function of the intensity of the light. The image sensor 12 may be made of a CCD sensor or a CMOS sensor.

The camera 60 also includes the controller 20 in addition to the housing 50 and the imaging device 10. The controller 20 is implemented by an electronic control unit (ECU) equipped with a CPU, a ROM, and a RAM and disposed inside the housing 50. The controller 20 includes the exposure controller 21 and the image processing unit 22 (which will also be referred to as an image processor).

The exposure controller 21 performs an exposure operation to control a shutter speed or a diaphragm of the camera 60 in order to regulate the intensity of light entering the image sensor 12. Specifically, when the intensity of light inputted to the image sensor 12 is high, the exposure controller 21 works to decrease the exposure of the image sensor 12. Alternatively, when the intensity of light inputted to the image sensor 12 is low, the exposure controller 21 works to increase the exposure of the image sensor 12. This brings the intensity of light to which the image sensor 12 is exposed into the above described range of the lower limit to the upper limit. This is because when the intensity of light inputted to the image sensor 12 drops below the lower limit, it may result in blocked-up shadows or crushed blacks due to the underexposure of the image sensor 12, while when the intensity of light inputted to the image sensor 12 rises above the upper limit, it may result in blown-out highlights or clipped whites due to the overexposure of the image sensor 12.

The image processing unit 22 analyzes the electrical signal outputted from the image sensor 12 to produce an image. The image processing unit 22 controls the tone curve or gain in image amplification to change the brightness of the image. Specifically, when the brightness of the image is undesirably low, the image processing unit 22 raises the tone curve and also increases the gain to increase the contrast and the brightness of the image. Alternatively, when the brightness of the image is undesirably high, the image processing unit 22 lowers the tone curve and also decreases the gain to decrease the contrast and the brightness of the image. This brings the contrast and the brightness of the image into a suitable range. In the following discussion, the tone curve and the gain will also be referred to as gain, etc.

The camera 60 outputs the image, as derived by the imaging device 10 and the controller 20, to the driver-assistance system 86. The driver-assistance system 86 analyses the inputted image to perform drive assist tasks including, for example, lane keeping, auto-cruise control, and pre-crush safety control.

Figure 4:
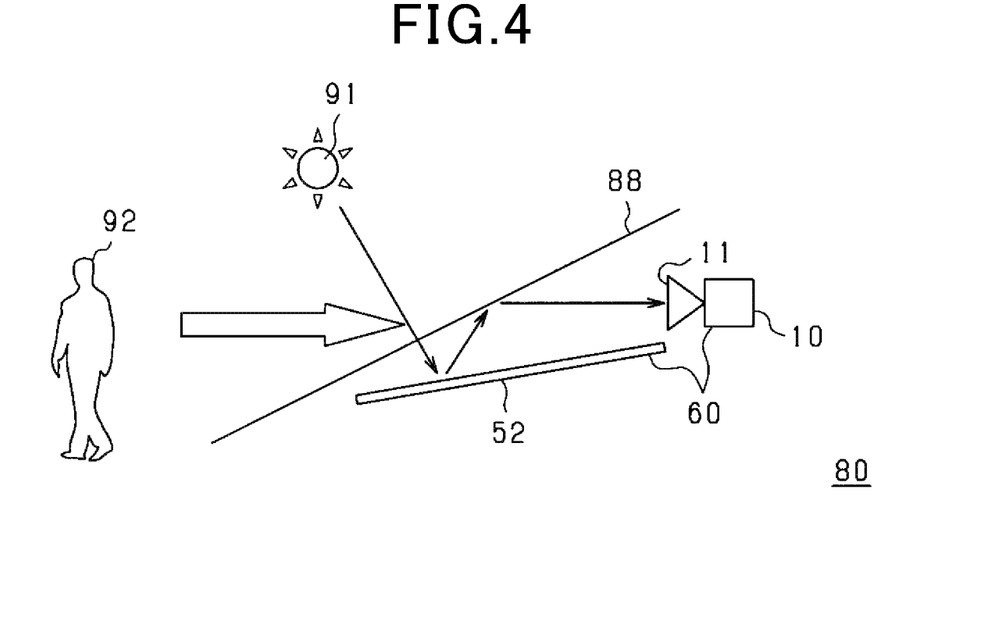
FIG. 4 is a side view which illustrates a camera mounted in a vehicle and an ambient condition around the vehicle in the first embodiment.

A problem to be solved by this embodiment will be discussed below. FIG. 4 is a side view which demonstrates the camera 60 and a region around the camera 60. In this embodiment, the camera 60 is equipped with the hood 52 to avoid, as described above, the unexpected appearance of the in-vehicle light source 87 in the image. However, as a tradeoff, the light of the sun 91 in a sunny area, as illustrated in FIG. 4, passes through the windshield 88, is reflected on the surface the hood 52, and also reflected by the windshield 88, and then enters the lens 11, thereby causing the sun 91 to appear in front of the subject 92 as an unexpected appearance in the image.

In order to avoid the above drawback, in the sunny area, the exposure controller 21 works to decrease the exposure. Simultaneously, the image processing unit 22 lowers the gain, etc. Alternatively, in a shaded area, the exposure controller 21 works to decrease the exposure. Simultaneously, the image processing unit 22 increases the gain.

However, immediately after the subject vehicle 80 moves from the sunny area into the shaded area, the unexpected appearance of the sun 91 will disappear suddenly in the image. In such an event, there is a probability that the regulation to increase the exposure may be too late for the above change, which results in occurrence of crushed blacks or the regulation to increase the gain may be too late, which results in excessive darkening of the image. Conversely, immediately after the subject vehicle 80 moves from the shaded area into the sunny area, the unexpected appearance of the sun 91 will suddenly appear in the image, which results in probability that the regulation to decrease the exposure may be too late for the above change, which results in occurrence of clipped whites or the regulation to decrease the gain may be too late, which results in excessive brightening of the image.

In order to eliminate the above drawback, the controller 20 is designed to have the boundary determiner 41 and the brightness boundary controller 42.

Figure 5:
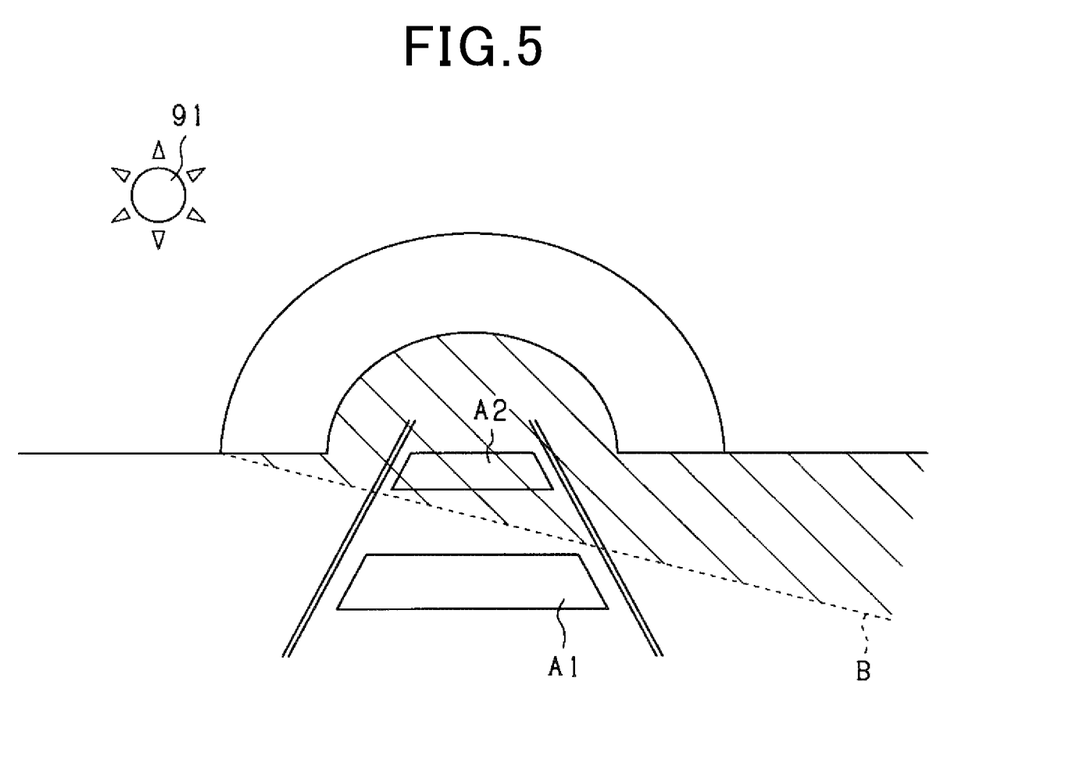
FIG. 5 is a perspective view which demonstrates an example of a forward view in front of a vehicle.

FIG. 5 is a perspective view which demonstrates a forward view in front of the subject vehicle 80. The boundary determiner 41 works to determine whether there is the brightness boundary B in front of the subject vehicle 80. The brightness boundary B is a boundary where the level of brightness changes in an image captured by the camera 60 by a given reference level or more in the forward view in front of the subject vehicle 80 in a traveling direction in which the subject vehicle 80 is heading. Specifically, the boundary determiner 41 determines whether a brightness ratio is lower than a lower limit or higher than an upper limit. The brightness ratio is a ratio of a brightness a2 of the far-field region A2 to a brightness a1 of the near-field region A1 (i.e., a2/a1) which is defined in the image to be located closer to the subject vehicle 80 than the far-field region A2 in the forward view in front of the subject vehicle 80. The lower limit is selected to be less than one. The upper limit is selected to be larger than one. If the brightness ratio (a2/a1) is determined to be lower than the lower limit, it is concluded that there is the brightness boundary B from the sunny area to the shaded area in the forward view in front of the subject vehicle 80. Conversely, if the brightness ratio (a2/a1) is determined to be higher than the upper limit, it is concluded that there is the brightness boundary B from the shaded area to the sunny area. If the brightness ratio (a2/a1) is larger than the lower limit and smaller than the upper limit, it is concluded that there is no brightness boundary B in the forward view in front of the subject vehicle 80.

For instance, the near-field region A1 is selected as a region which is located a given distance (e.g., a few meters to a few tens of meters) ahead of the subject vehicle 80 in an image captured by the camera 60 and a few meters long and a few meters wide. The far-field region A2 is defined a given distance away from the near-field region A1 in the forward direction of the subject vehicle 80. The brightness a1 of the near-field region A1 is given by an average of brightness of an area of the image occupied by the near-field region A1. Similarly, the brightness a2 of the far-field region A2 is given by an average of brightness of an area of the image occupied by the far-field region A2.

More specifically, the boundary determiner 41 may be configured to define the near-field region A1 and the far-field region A2 in the image using a relation of locations of the near-field region A1 and the far-field region A2 in the image with actual distances of the near-field region A1 and the far-field region A2 from the subject vehicle 80 or define the near-field region A1 and the far-field region A2 in the image in fusion with image recognition techniques or a radar.

When the boundary determiner 41 determines that the brightness boundary B from the sunny area to the shaded area exists in the image in front of the subject vehicle 80, the brightness boundary controller 42 executes a boundary brightness control strategy to increase the exposure and the gain, etc. at a time when the subject vehicle 80 passes the brightness boundary B. Alternatively, when the boundary determiner 41 determines that there is the brightness boundary B from the shaded area to the sunny area in the image in the forward direction of the subject vehicle 80, the brightness boundary controller 42 executes the boundary brightness control to decrease the exposure and the gain, etc. at a time when the subject vehicle 80 passes the brightness boundary B. The adjustment of the exposure in the boundary brightness control is achieved by the exposure controller 21 in response to a control signal from the brightness boundary controller 42. The adjustment of the gain, etc. in the boundary brightness control is achieved by the image processing unit 22 in response to a control signal from the brightness boundary controller 42. This enables the adjustment of the exposure and the gain, etc. to suitable values to be made more quickly than in the absence of the boundary brightness control (i.e., boundary brightness adjustment). The boundary brightness control will also be discussed below in detail.

Figure 6:
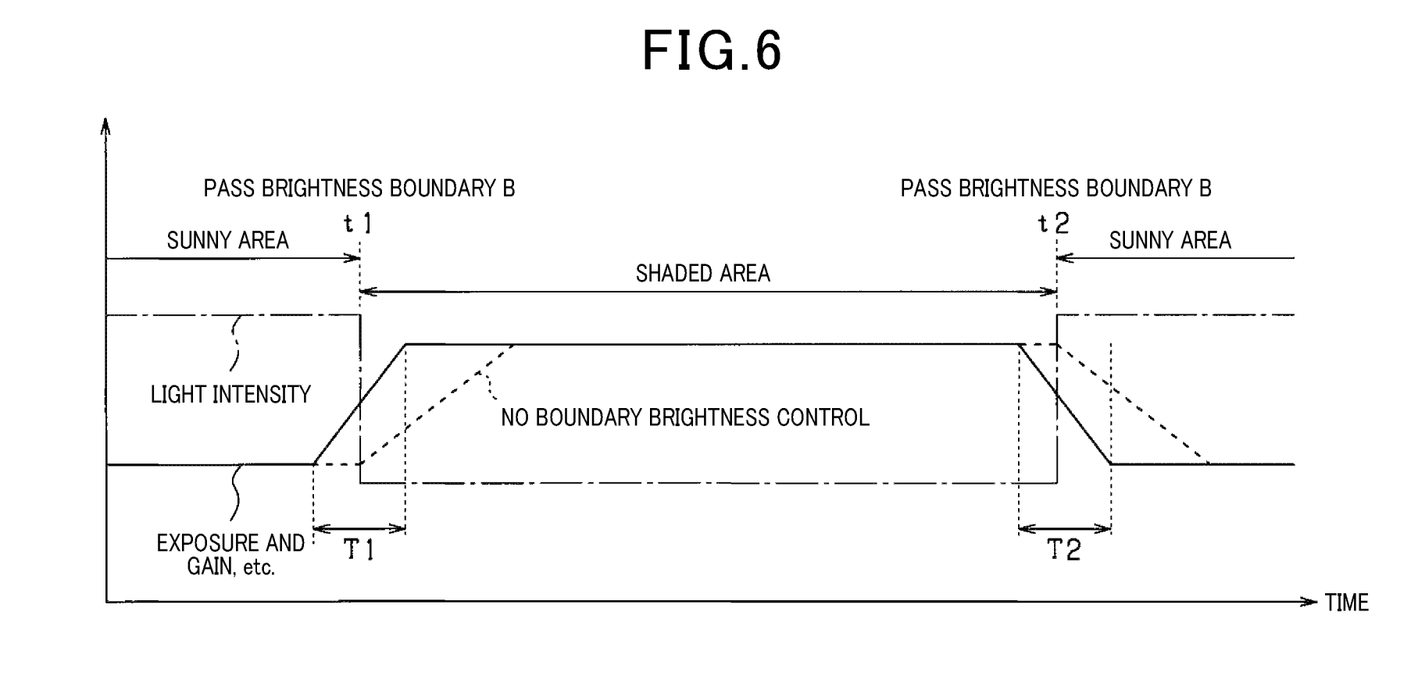
FIG. 6 is a graph which represents a change in intensity of light and changes in exposure, gain, etc. in a camera in the first embodiment.

FIG. 6 is a graph which demonstrates changes in intensity of light inputted to the imaging device 10 and changes in exposure and gain, etc. When the subject vehicle 80 moves from the sunny area to the shaded area and passes the brightness boundary B, the brightness boundary controller 42, as illustrated in the left side of FIG. 6, executes the boundary brightness control to increase the exposure and the gain, etc. Specifically, the brightness boundary controller 42 starts to increase the exposure and the gain, etc. slightly before the subject vehicle 80 passes the brightness boundary B, thereby resulting in a quick raise in exposure and increase in gain, etc. as compared with in the absence of the boundary brightness control indicated by a left broken line in FIG. 6. In the absence of the boundary brightness control indicated by the broken line in FIG. 6, the exposure controller 21 changes the exposure as a function of intensity of light entering the image sensor 12 to raise the exposure after the subject vehicle 80 passes the brightness boundary B. Simultaneously, the image processing unit 22 changes the gain as a function of the brightness of the image to increase the gain.

It is advisable in the boundary brightness control that a rate at which the exposure and the gain, etc., are increased, in other words, a positive inclination of increase in exposure and gain, etc. in the graph of FIG. 6 be increased to be larger than in the absence of the boundary brightness control. This also results in a quick raise in exposure and increase in gain, etc. as compared with in the absence of the boundary brightness control. The brightness boundary controller 42 in this embodiment terminates the increase in exposure and gain, etc. after the subject vehicle 80 passes the brightness boundary B. This causes a boundary brightness control time period T1 that is a time interval between the start and termination of the increase in exposure and gain, etc. to include the time t1 at which the subject vehicle 80 passes the brightness boundary B.

Alternatively, when the subject vehicle 80 moves from the shaded area to the sunny area and passes the brightness boundary B, the brightness boundary controller 42, as illustrated in the right side of FIG. 6, executes the boundary brightness control to decrease the exposure and the gain, etc. Specifically, the brightness boundary controller 42 starts to decrease the exposure and the gain, etc. slightly before the subject vehicle 80 passes the brightness boundary B, thereby resulting in a quick drop in exposure and increase in gain, etc. as compared with in the absence of the boundary brightness control indicated by a right broken line in FIG. 6.

It is advisable in the boundary brightness control that a rate at which the exposure and the gain, etc., are decreased, in other words, a negative inclination of decrease in exposure and gain, etc. in the graph of FIG. 6 be increased to be larger than in the absence of the boundary brightness control. This also results in quick decreases in exposure and gain, etc. as compared with in the absence of the boundary brightness control. The brightness boundary controller 42 terminates the decrease in exposure and gain, etc. after the subject vehicle 80 passes the brightness boundary B. This causes a boundary brightness control time period T2 that is a time interval between the start and termination of the decrease in exposure and gain, etc. to include the time t2 at which the subject vehicle 80 passes the brightness boundary B.

The boundary brightness control, as apparent from the above discussion, works to quickly increase the exposure and the gain, etc. in the camera 60 at the time when the subject vehicle 80 passes the brightness boundary B from the sunny area to the shaded area or quickly decrease the exposure and the gain, etc. in the camera 60 at the time when the subject vehicle 80 passes the brightness boundary B from the shaded area to the sunny area. This eliminates a risk that blocked-up shadows or clipped whites may occur in the image or the image may become dark immediately after the subject vehicle 80 passes the brightness boundary B, thereby solving the above described problems.

In order to eliminate an error in the boundary brightness control, the controller 20 is also equipped with the low speed determiner 31, the high yaw rate determiner 32, and the low brightness determiner 33 which will be described below in detail.

Figure 7:
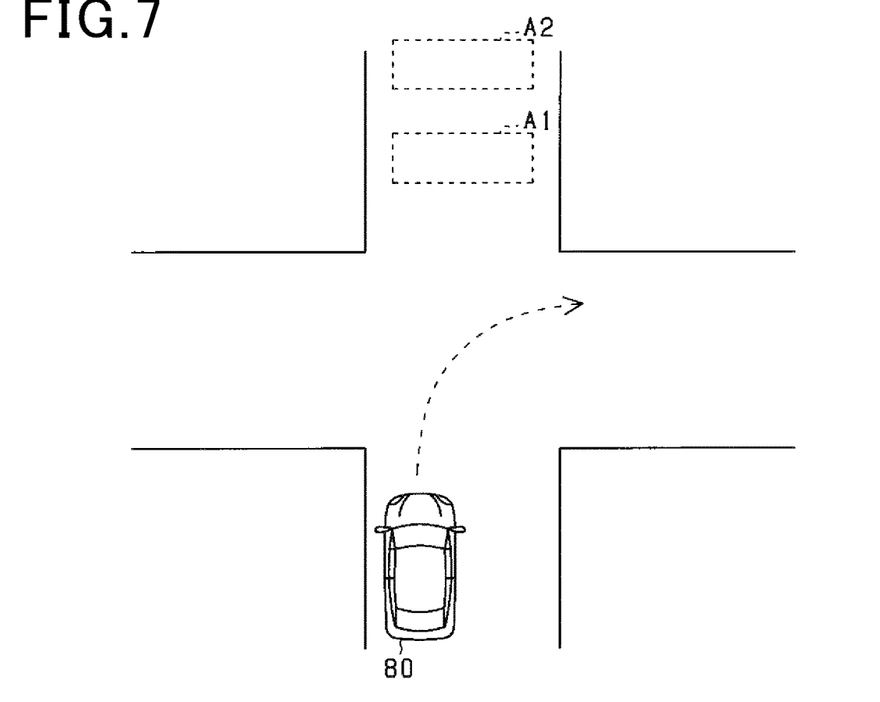
FIG. 7 is a plan view which demonstrates a subject vehicle immediately before turning at an intersection of roads.

FIG. 7 is a plan view which demonstrates the subject vehicle 80 immediately before it turns at an intersection. The near-field region A1 and the far-field region A2 are, as indicated by broken lines, defined straight ahead of the subject vehicle 80. When the subject vehicle 80 is about to turn right at the intersection, it may cause the controller 20 to erroneously execute the boundary brightness control on a forward zone through which the subject vehicle 80 will not pass. If the brightness boundary B is determined in the boundary brightness control mode to exist ahead of the subject vehicle 80, it will cause the controller 20 to start to execute the boundary brightness control only based on the fact that the brightness boundary B exists ahead the subject vehicle 80. When an interval between the subject vehicle 80 and a vehicle head is lessened, it may cause a view of the imaging device 10 of the camera 60 to be obstructed by the vehicle ahead, thereby resulting in a failure in executing the boundary brightness control correctly.

The low speed determiner 31 determines whether the speed of the subject vehicle 80 is lower than a given threshold, in other words, whether the subject vehicle 80 is traveling at a low speed which is lower than the given threshold. If the subject vehicle 80 is determined to be traveling at low speed, the low speed determiner 31 inhibits the boundary determiner 41 from determining that there is the brightness boundary B in the image in the boundary brightness control mode. This is because when the subject vehicle 80 is traveling at low speed, there is a high probability that the subject vehicle 80 is decelerating in order to turn left or right or the interval between the subject vehicle 80 and a vehicle ahead is small. The above inhibition eliminates a risk that the boundary brightness control may be executed in response to a determination that the brightness boundary B exists in a forward zone through which the subject vehicle 80 will not pass or the boundary control may be initiated even though the view of the imaging device 10 is obstructed by the vehicle ahead.

Figure 8:
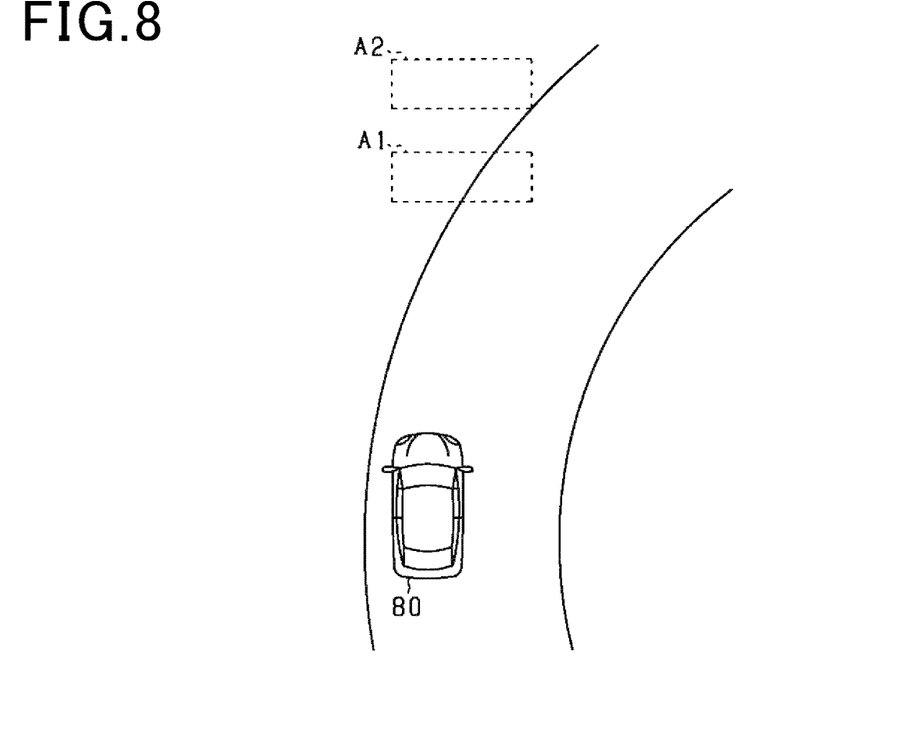
FIG. 8 is a plan view which demonstrates a subject vehicle cornering.

FIG. 8 is a plan view which demonstrates the subject vehicle 80 traveling in a curve of a road. When the near-field region A1 and the far-field region A2 are, as indicated by broken lines, defined in front of the subject vehicle 80 while cornering, it may cause the boundary brightness control strategy to be executed on a forward zone through which the subject vehicle 80 will not pass. When the brightness boundary B is determined to exist in front of the subject vehicle 80 in the boundary brightness control mode, it will cause the boundary brightness control to be performed in error based on the fact that the brightness boundary B exists in front of the subject vehicle 80. In order to alleviate such drawbacks, the high yaw rate determiner 32 serves to determine a yaw rate of the subject vehicle 80 is higher than a given yaw rate threshold and inhibits the boundary brightness control strategy from being executed when the yaw rate of the subject vehicle 80 is higher than the given yaw rate threshold. This eliminates a risk that the boundary brightness control strategy may be initiated in error in response to finding of the brightness boundary B in the forward zone through which the subject vehicle 80 will not pass.

Figure 9:
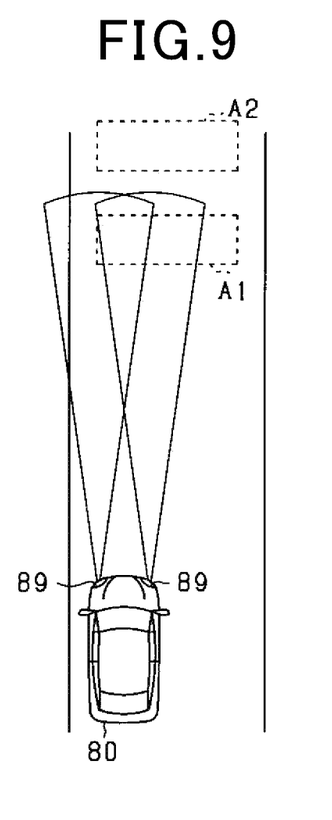
FIG. 9 is a plan view which demonstrates a subject vehicle traveling at night.

FIG. 9 is a plan view which demonstrates the subject vehicle 80 traveling at night. The night traveling of the subject vehicle 80 results in a drawback that the boundary determiner 41 may identify a boundary between a bright area illuminated by the headlights 89 of the subject vehicle 80 and another dark area on the road in error as the brightness boundary B. In order to alleviate such a drawback, the low brightness determiner 33 serves to determine whether an ambient brightness around the subject vehicle 80 is lower than a given brightness threshold. This determination may be made using the quantity of light inputted to the image sensor 12 and the degree of exposure of the image sensor 12. The low brightness determiner 33 inhibits the boundary brightness control strategy from being executed to determine that the brightness boundary B exist in front of the subject vehicle 80 when the ambient brightness around the subject vehicle 80 is determined to be lower than the given brightness threshold. This eliminates a risk that the boundary brightness control strategy may be initiated in error in response to identification of the boundary between the bright area illuminated by the headlights 89 of the subject vehicle 80 and the dark area on the road as the brightness boundary B.

Figure 10:
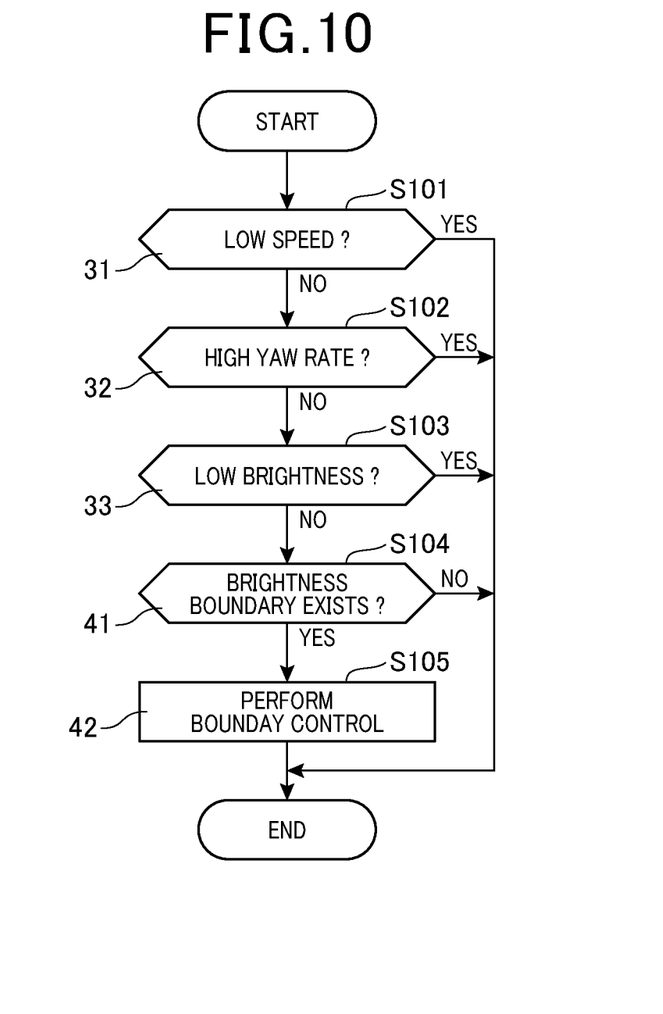
FIG. 10 is a flowchart of a boundary brightness control program executed by a camera in the first embodiment.

FIG. 10 is a flowchart of a sequence of logical steps or boundary brightness control strategy performed by the controller 20 at a given time interval.

After entering the program, the routine proceeds to step S101 wherein the low speed determiner 31 determines whether the subject vehicle 80 is traveling at a low speed. If a YES answer is obtained, then the routine terminates without executing the boundary brightness control strategy. Alternatively, if a NO answer is obtained, then the routine proceeds to step S102 wherein the high yaw rate determiner 32 determines whether the yaw rate of the subject vehicle 80 is higher than the given yaw rate threshold. If a YES answer is obtained, then routine terminates without executing the boundary brightness control strategy. Alternatively, if a NO answer obtained meaning that the subject vehicle 80 is not undergoing a high yaw rate, then the routine proceeds to step S103.

In step S103, the low brightness determiner 33 determines whether an ambient brightness around the subject vehicle 80 is lower than the given brightness threshold. If a YES answer is obtained, then the routine terminates without executing the boundary brightness control strategy. Alternatively, if a NO answer is obtained meaning that the ambient brightness around the subject vehicle 80 is not low, then the routine proceeds to step S104.

In step S104, the boundary determiner 41 determines whether there is the brightness boundary B. If a NO answer is obtained meaning that there is no brightness boundary B, then the routine terminates without executing the boundary brightness control strategy. Alternatively, if a YES answer is obtained, then the routine proceeds to step S105 wherein the brightness boundary controller 42 executes the boundary brightness control strategy. The routine then terminates.

This embodiment offers the following beneficial advantage.

The camera 60 is equipped with the hood 52, thereby eliminating a risk that unexpected appearance of the in-vehicle light source 87 may be in the image captured by the camera 60.

The low speed determiner 31 determines whether the subject vehicle 80 is traveling at low speed and inhibits the brightness boundary B from being determined to exist in front of the subject vehicle 80 when the subject vehicle 80 is determined as traveling at low speed. This eliminates a risk that the boundary brightness control strategy may be executed in response to a determination that the brightness boundary B exists in a forward zone through which the subject vehicle 80 will not pass or the boundary control strategy may be initiated even though the view of the imaging device 10 is obstructed by the vehicle ahead.

The high yaw rate determiner 32 inhibits the brightness boundary B from being determined to exist in front of the subject vehicle 80 when the subject vehicle 80 is determined as undergoing a high yaw rate. This also eliminates the risk that the boundary brightness control strategy may be executed in response to a determination that the brightness boundary B exists in a forward zone through which the subject vehicle 80 will not pass.

The low brightness determiner 33 determines whether the ambient brightness around the subject vehicle 80 is lower than the given brightness threshold and inhibits the brightness boundary B from being determined to exist in front of the subject vehicle 80 when the ambient brightness around the subject vehicle 80 is low. This eliminates a risk that a boundary between a dark area and a bright area of the road illuminated by the headlights 89 may be determined in error as being the brightness boundary B.

The boundary determiner 41 determines whether there is the brightness boundary B in front the subject vehicle 80 using levels of brightness of the near-field region A1 and the far-field region A2. In other words, the boundary determiner 41 is capable of detecting the presence of the brightness boundary B as a function of a change in brightness in front of the subject vehicle 80.

The brightness boundary controller 42 initiates the boundary brightness control strategy when the brightness boundary B is determined to be in front of the subject vehicle 80. This enables the exposure of the camera 60 and the gain, etc. used in the image processing operation of the camera 60 to start to be adjusted in the boundary brightness control mode before the subject vehicle 80 passes through the brightness boundary B. This results in more quick adjustment of the exposure and the gain, etc. than in the absence of the boundary brightness control strategy, thereby eliminating a risk that blocked-up shadows or clipped whites may occur in an image captured by the camera 60 or the image may become undesirably dark immediately after the subject vehicle 80 moves from a sunny area into a shaded area of the road.

The adjustment of the exposure and the gain, etc. in the boundary brightness control mode terminates after the subject vehicle 80 passes the brightness boundary B. This causes the boundary brightness control time period T1 or T2 include the time t1 or t2 at which the subject vehicle 80 passes the brightness boundary B.

Second Embodiment

The camera 60 according to the second embodiment will be described below. In the following discussion, the same or similar parts to those in the first embodiment are denoted by the same or similar reference numbers, and explanation thereof in detail will be omitted here.

Figure 11:
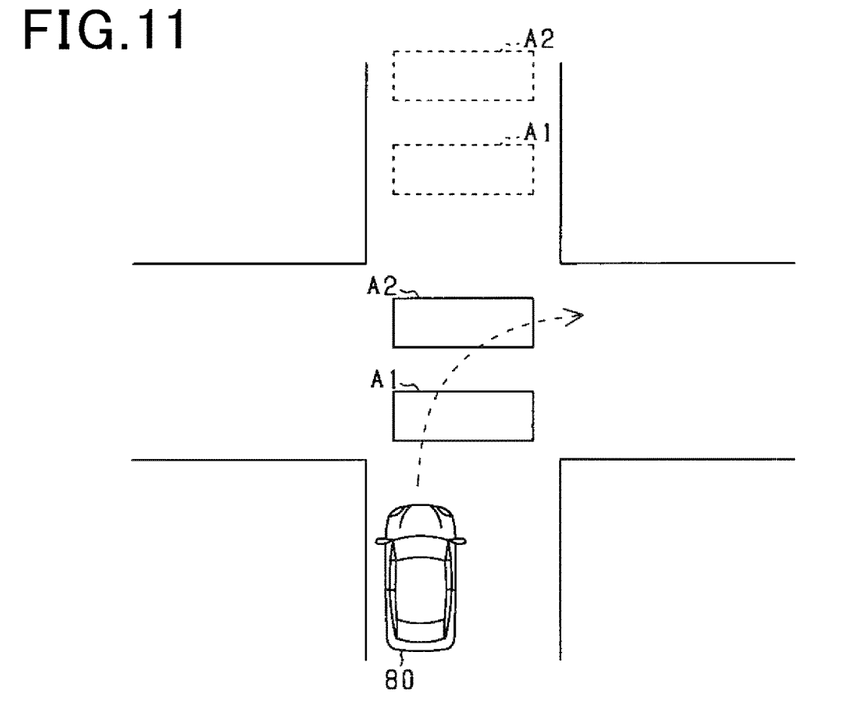
FIG. 11 is a plan view which demonstrates a subject vehicle immediately before turning at an intersection of roads in the second embodiment.

FIG. 11 is a plan view which demonstrates the subject vehicle 80 immediately before turning at the intersection of roads. When the speed of the subject vehicle 80 is low, there is, as described above, a high probability that the subject vehicle 80 is decelerating in order to turn left or right or the interval between the subject vehicle 80 and a vehicle ahead is short. The boundary determiner 41, therefore, defines areas, as indicated by solid lines A1 and A2, in the image which are targets on which the boundary determination is made when the speed of the subject vehicle 80 is lower than a given speed threshold to be located closer to the subject vehicle 80 than areas, as indicated by broken lines A1 and A2, in the image which are targets on which the boundary determination is made when the speed of the subject vehicle 80 is higher than the given speed threshold are. For instance, the boundary determiner 41 defines the near-field region A1 and the far-field region A2 to be located closer to the subject vehicle 80 with a decrease in speed of the subject vehicle 80.

The camera 60 in this embodiment, as apparent from the above discussion, works to shift areas in a captured image which are used to determine the presence of the brightness boundary B closer to the subject vehicle 80 as the speed of the subject vehicle 80 decreases. This eliminates a risk that the boundary brightness control strategy may be executed in response to a determination that the brightness boundary B exists in a forward zone through which the subject vehicle 80 will not pass because the subject vehicle 80 will turn right or left or the boundary control strategy may be initiated about a forward zone where the view of the imaging device 10 is obstructed by a vehicle ahead because an interval between the subject vehicle 80 and the vehicle ahead becomes short.

Third Embodiment

The camera 60 according to the third embodiment will be described below in terms of parts different from those in the first embodiment.

Figure 12:
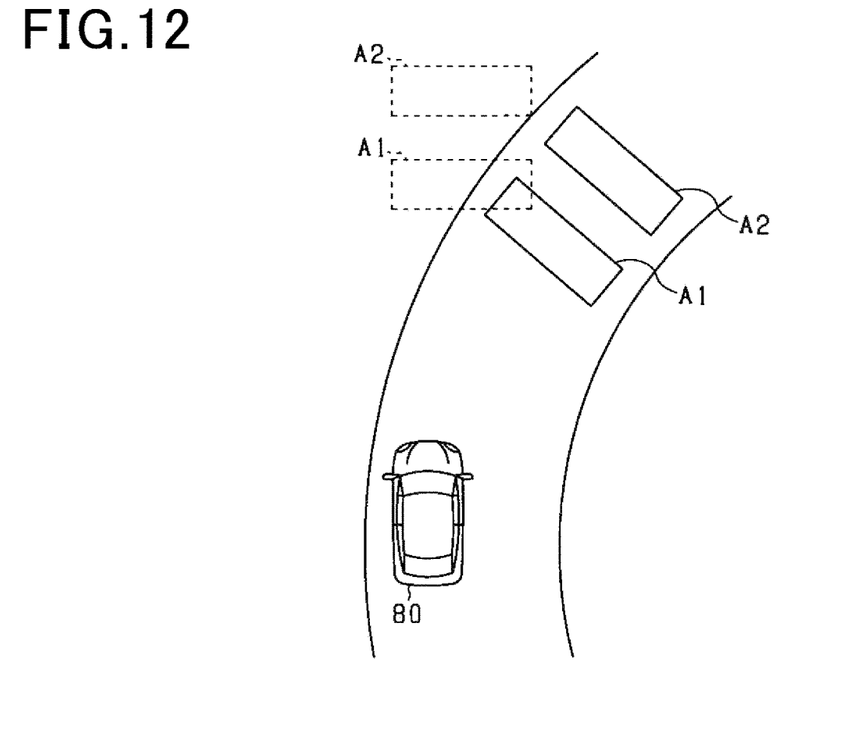
FIG. 12 is a plan view which demonstrates a subject vehicle cornering in the third embodiment.

FIG. 12 is a plan view which demonstrates the subject vehicle 80 while cornering. When the near-field region A1 and the far-field region A2 are, as indicated by broken lines, defined in front of the subject vehicle 80 while cornering, it may, as described already, cause the boundary brightness control strategy to be executed in error on a forward zone through which the subject vehicle 80 will not pass. The boundary determiner 41 defines the near-field region A1 and the far-field region A2, as indicated by the broken lines, in the image which are targets on which the boundary determination is made when the yaw rate of the subject vehicle 80 is lower than the given yaw rate. When the yaw rate of the subject vehicle 80 is higher than the given yaw rate, the boundary determiner 41 shifts the near-field region A1 and the far-field region A2 in a direction in which the yaw rate acts on the subject vehicle 80, in other words, the subject vehicle 80 is yawing and defines regions, as indicated by solid lines. In other words, the boundary determiner 41 shifts areas in the image on which the boundary determination is made when the yaw rate of the subject vehicle 80 is higher than the given yaw rate from areas in the image on which the boundary determination is made when the yaw rate of the subject vehicle 80 is lower than the given yaw rate in the direction in which the yaw rate acts on the subject vehicle 80. To say it in a different way, the boundary determiner 41 defines and shifts the near-field region A1 and the far-field region A2 in the direction in which the subject vehicle 80 is yawing with an increase in yaw rate acting on the subject vehicle 80.

The camera 60 in this embodiment, as apparent from the above discussion, works to shift area in a captured image which are used to determine the presence of the brightness boundary B in the direction in which the subject vehicle 80 is yawing with an increase in yaw rate acting on the subject vehicle 80. This eliminates a risk that the boundary brightness control strategy may be executed in error while the subject vehicle 80 is yawing in response to a determination that the brightness boundary B exists in a forward zone through which the subject vehicle 80 will not pass.

Other Embodiments

The camera 60 in each of the above embodiments may be modified in the following way.

The camera 60 is used in each embodiment as a driver-assistance camera which sends a captured image to the driver-assistance system 86, but however, may alternatively be designed as a dashboard camera. The camera 60 may be designed not to have the hood 52. The camera 60 has the single housing 50 in which the imaging device 10 and the controller 20 are disposed, but may alternatively be equipped with two discrete housings one for each of the imaging device 10 and the controller 20.

The controller 20 in each embodiment is equipped with the low speed determiner 31, the high yaw rate determiner 32, and the low brightness determiner 33, however, may alternatively be designed not to have at least one of them. The controller 20 may also be configured to have a combination of the structures in the second and third embodiments.

The boundary determiner 41 in each embodiment, as described above, makes the boundary determination using the brightness ratio (a2/a1) that is a ration of the brightness a2 of the far-field region A2 to the brightness a1 of the near-field region A1 in the image, but however, the boundary determination may alternatively be made using a brightness difference (a2−a1) that is a difference between the brightness a1 of the near-field region A1 and the brightness a2 of the far-field region A2. Specifically, when the brightness difference (a2−a1) is less than a given negative threshold, in other words, an absolute value of the brightness difference (a2−a1) is larger than an absolute value of the given negative threshold, the boundary determiner 41 may conclude that there is the brightness boundary B from a sunny area to a shaded area (i.e., between the near-field region A1 and the far-field region A2) in a forward view in front of the subject vehicle 80. Alternatively, when the brightness difference (a2−a1) is larger than a given positive threshold, the boundary determiner 41 may conclude that there is the brightness boundary B from a shaded area to a sunny area in the forward view in front of the subject vehicle 80.

The boundary determiner 41 in each embodiment, as described above, makes the boundary determination using the brightness a1 of the near-field region A1 and the brightness a2 of the far-field region A2, however, may alternatively be designed to make boundary determination using a value derived by differentiating the brightness in front of the subject vehicle 80 with respect to the traveling direction of the subject vehicle 80. Specifically, when the differential value is lower than a given negative threshold, in other words, an absolute value of the differential value is larger than an absolute value of the given negative threshold, the boundary determiner 41 may conclude that there is the brightness boundary B from a shaded area to a sunny area in a forward view in front of the subject vehicle 80. Alternatively, when the differential value is larger than a given positive threshold, the boundary determiner 41 may determine that there is the brightness boundary B from a shaded area to a sunny area in the forward view.

The boundary determiner 41 in each embodiment determines whether the brightness boundary B exists from the sunny area to the shaded area or vice versa in a forward zone, as viewed in the traveling direction of the subject vehicle 80, but however, may alternatively handle the brightness boundary B existing only from one of the sunny area and the shaded area to the other.

The brightness boundary controller 42 in each embodiment works to control the exposure and the gain, etc. in the image processing operation of the camera 60 when the subject vehicle 80 passes the brightness boundary B, but however, it may change only either the exposure or the gain, etc.

The brightness boundary controller 42 in each embodiment starts to control the exposure and the gain, etc. in the brightness control mode before the subject vehicle 80 passes the brightness boundary B and terminates such control after the subject vehicle 80 passes the brightness boundary B, but however, it may alternatively be designed to increase the degree of sensitivity to adjustment of the exposure and the gain, etc., in other words, increase a target value of the exposure and/or the gain before the subject vehicle 80 passes the brightness boundary B and decrease the degree of sensitivity (i.e., the target value of the exposure and/or the gain) down to an initial value thereof after the subject vehicle 80 passes the brightness boundary B. This causes the brightness boundary controller 42 to start to change or increase the exposure and/or the gain, etc., immediately after the subject vehicle 80 passes the brightness boundary B, but however, the degree of sensitivity of adjustment of the exposure and/or the gain, etc. has already been increased, in other words, the target value of the exposure and/or the gain, etc. has already been increased at a time when the subject vehicle 80 passes the brightness boundary B, thereby resulting in an increased rate at which the exposure and/or the gain, etc., is adjusted to a selected value (i.e., the target values) immediately after the subject vehicle 80 passes the brightness boundary B. The return of the degree of sensitivity to the initial value also eliminates a risk of instability of the exposure and the gain, etc., arising from an excessive degree of the sensitivity immediately after the subject vehicle 80 passes.

The boundary determiner 41 in the second embodiment, as described above, defines areas of the captured image on which the boundary determination should be made to be located close to the subject vehicle 80 when the speed of the subject vehicle 80 is low, but however, it may be designed to narrow such areas when the speed of the subject vehicle 80 is low.

The boundary determiner 41 in the third embodiment shifts areas of the captured image on which the boundary determination should be made in the direction in which the subject vehicle 80 is yawing when the yaw rate acting on the subject vehicle 80 is high, but however, it may alternatively be designed to decrease the size of such areas when the yaw rate of the subject vehicle 80 is high.

What is claimed is:

1. A vehicle mountable camera comprising:
   an imaging device which is configured to be disposed behind a windshield of a subject vehicle and works to capture an image of a forward view in front of the subject vehicle;
   an exposure controller which controls exposure of the imaging device;
   an image processor which performs an image processing operation on the image captured by the imaging device;
   a boundary determiner which performs a boundary determination of whether there is a brightness boundary where a level of brightness changes by a given reference level or more in a forward region in front of the subject vehicle in the image in a traveling direction in which the subject vehicle is heading; and
   a brightness boundary controller which, when the brightness boundary is determined by the boundary determiner to exist, executes a boundary brightness control strategy to change at least one of the exposure and image brightness in the image processing operation.

2. The vehicle mountable camera as set forth in claim 1, further comprising a hood which protrudes forward below the imaging device and blocks light which is emitted from a light source in the subject vehicle and reflected on the windshield so that it may enter the imaging device.

3. The vehicle mountable camera as set forth in claim 1, wherein the boundary determiner defines a far-field region and a near-field region which is located closer to the subject vehicle than the far-field region is in the image and executes the boundary determination using a brightness of the far-field region and a brightness of the near-field region.

4. The vehicle mountable camera as set forth in claim 1, wherein the brightness boundary controller starts changing the at least one of the exposure and the image brightness before the subject vehicle passes the brightness boundary and terminates changing the at least one of the exposure and the image brightness after the subject vehicle passes the brightness boundary.

5. The vehicle mountable camera as set forth in claim 1, further comprising a low speed determiner which determines whether the subject vehicle is traveling at a low speed which is lower than a given threshold, and in response to the subject vehicle being determined to be traveling at the low speed, the boundary determiner determines that the brightness boundary exists in front of the subject vehicle.

6. The vehicle mountable camera as set forth in claim 1, further comprising a high yaw rate determiner which determines a yaw rate of the subject vehicle is higher than a given yaw rate threshold, and wherein the yaw rate of the subject vehicle is determined to be higher than the given yaw rate threshold, the high yaw rate determiner inhibits the boundary brightness control strategy from being executed.

7. The vehicle mountable camera as set forth in claim 1, further comprising a low brightness determiner which serves to determine whether an outside brightness around the subject vehicle is lower than a given brightness threshold, and wherein when the outside brightness is determined to be lower than the given brightness threshold, the low brightness determiner inhibits the boundary brightness control strategy from being executed.

8. The vehicle mountable camera as set forth in claim 1, wherein the boundary determiner defines areas in the image on which the boundary determination is made when a speed of the subject vehicle is lower than a given speed threshold to be located closer to the subject vehicle than areas on which the boundary determination is made when the speed of the subject vehicle is higher than the given speed threshold are.

9. The vehicle mountable camera as set forth in claim 1, wherein the boundary determiner shifts areas in the image on which the boundary determination is made when a yaw rate of the subject vehicle is higher than a given yaw rate from areas in the image on which the boundary determination is made when the yaw rate of the subject vehicle is lower than the given yaw rate in a direction in which the yaw rate acts on the subject vehicle.

10. The vehicle mountable camera as set forth in claim 1, wherein the brightness boundary controller starts to execute the boundary brightness control strategy before the subject vehicle passes the brightness boundary.

* * * * *